United States Patent
Williams et al.

(10) Patent No.: US 9,070,010 B2
(45) Date of Patent: Jun. 30, 2015

(54) IMAGE CHECK CONTENT ESTIMATION AND USE

(75) Inventors: Geoffrey R. Williams, Midlothian, TX (US); Timmy L. Gauvin, Atlanta, GA (US); Eric S. Sandoz, Concord, CA (US); Kerry M. Cantley, Fort Mill, SC (US); Leslie M. LaRock, Davidson, NC (US); James F. Barrett, II, Morristownship, NJ (US); James G. Ronca, Decatur, GA (US); Deborah N. Bennett, Conyers, GA (US); Joshua A. Beaudry, Brooklyn, NY (US)

(73) Assignee: Bank of America Corporation, Charlotte, NC (US)

( * ) Notice: Subject to any disclaimer, the term of this patent is extended or adjusted under 35 U.S.C. 154(b) by 289 days.

(21) Appl. No.: 13/567,780

(22) Filed: Aug. 6, 2012

(65) Prior Publication Data

US 2014/0037182 A1 Feb. 6, 2014

(51) Int. Cl.
G06K 9/00 (2006.01)
G06K 9/18 (2006.01)
G06K 9/54 (2006.01)
G06K 9/60 (2006.01)
G06K 9/20 (2006.01)
G06Q 20/04 (2012.01)

(52) U.S. Cl.
CPC ........ *G06K 9/00449* (2013.01); *G06K 9/00469* (2013.01); *G06K 9/00852* (2013.01); *G06K 9/2063* (2013.01); *G06Q 20/042* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 4,947,321 A | 8/1990 | Spence et al. | |
| 5,159,548 A | 10/1992 | Caslavka | |
| 5,198,975 A | 3/1993 | Baker et al. | |
| 5,488,671 A * | 1/1996 | Kern | 382/138 |
| 5,594,226 A | 1/1997 | Steger | |
| 5,963,659 A | 10/1999 | Cahill et al. | |
| 6,055,327 A * | 4/2000 | Aragon | 382/138 |
| 6,073,121 A | 6/2000 | Ramzy | |
| 6,129,273 A | 10/2000 | Shah | |
| 6,181,837 B1 | 1/2001 | Cahill et al. | |

(Continued)

OTHER PUBLICATIONS

Koerich et al., "A System for Automatic Extraction of the User-Entered Data from Bankchecks", International Symposium on Computer Graphics, Vision and Image Processing (SIBIGRAPI), Rio de Janeiro, Brazil, 1998, pp. 270-277.*

(Continued)

*Primary Examiner* — Matthew Bella
*Assistant Examiner* — Jose M Torres
(74) *Attorney, Agent, or Firm* — Weiss & Arons LLP; Michael A. Springs, Esq.

(57) ABSTRACT

Apparatus, methods and media for deriving a transaction record based on handwritten check content. The apparatus may include, and the methods and media may involve, a receiver device that is configured to receive a check image. The apparatus may include, and the methods and media may involve, a processor device. The processor device may be configured to define a check segment within the check image; translate content from the segment from handwriting to estimated block text; and store the block text in a transaction record in machine readable memory. The apparatus may include, and the methods and media may involve, a transmitter that is configured to transmit the block text to a financial institution product engine.

9 Claims, 9 Drawing Sheets

(56) References Cited

U.S. PATENT DOCUMENTS

| | | | |
|---|---|---|---|
| 6,384,844 | B1 | 5/2002 | Stewart et al. |
| 6,574,377 | B1 | 6/2003 | Cahill et al. |
| 6,863,214 | B2 | 3/2005 | Garner, IV et al. |
| 6,959,326 | B1 | 10/2005 | Day et al. |
| 7,004,382 | B2 | 2/2006 | Sandru |
| 7,020,320 | B2 * | 3/2006 | Filatov ................ 382/137 |
| 7,090,131 | B2 | 8/2006 | Natsuno |
| 7,124,113 | B1 | 10/2006 | Fairclough et al. |
| 7,165,723 | B2 | 1/2007 | McGlamery et al. |
| 7,349,884 | B1 | 3/2008 | Odom et al. |
| RE40,220 | E | 4/2008 | Nichols et al. |
| 7,379,978 | B2 | 5/2008 | Anderson et al. |
| 7,389,914 | B1 | 6/2008 | Enright et al. |
| 7,391,934 | B2 | 6/2008 | Goodall et al. |
| 7,461,775 | B2 | 12/2008 | Swift et al. |
| 7,471,818 | B1 | 12/2008 | Price et al. |
| 7,606,408 | B2 | 10/2009 | Takiguchi |
| 7,680,317 | B2 | 3/2010 | Adelberg et al. |
| 7,680,318 | B2 | 3/2010 | Agrawal et al. |
| 7,689,025 | B2 | 3/2010 | Takiguchi |
| 7,752,286 | B2 | 7/2010 | Anderson et al. |
| 7,757,938 | B2 | 7/2010 | Richardson et al. |
| 7,856,403 | B2 | 12/2010 | Venturo et al. |
| 7,962,412 | B2 | 6/2011 | Omura et al. |
| 8,045,818 | B2 | 10/2011 | Sato et al. |
| 8,052,040 | B2 | 11/2011 | Stover |
| 8,121,950 | B2 | 2/2012 | Hassanein et al. |
| 8,162,125 | B1 | 4/2012 | Csulits et al. |
| 8,467,591 | B1 | 6/2013 | Csulits et al. |
| 2002/0067827 | A1 | 6/2002 | Kargman |
| 2002/0067846 | A1 | 6/2002 | Foley |
| 2004/0076320 | A1 | 4/2004 | Downs, Jr. |
| 2004/0133516 | A1 | 7/2004 | Buchanan et al. |
| 2004/0217170 | A1 | 11/2004 | Takiguchi et al. |
| 2005/0139670 | A1 | 6/2005 | McGlamery et al. |
| 2005/0139671 | A1 | 6/2005 | McGlamery et al. |
| 2005/0144131 | A1 | 6/2005 | Aziz |
| 2005/0144189 | A1 | 6/2005 | Edwards et al. |
| 2005/0281449 | A1 | 12/2005 | Takiguchi |
| 2005/0281450 | A1 | 12/2005 | Richardson |
| 2006/0088199 | A1 | 4/2006 | Shizuka et al. |
| 2006/0124727 | A1 | 6/2006 | Kotovich et al. |
| 2006/0144937 | A1 | 7/2006 | Heilper et al. |
| 2006/0184441 | A1 | 8/2006 | Haschka et al. |
| 2006/0186194 | A1 | 8/2006 | Richardson et al. |
| 2006/0191998 | A1 | 8/2006 | Mueller et al. |
| 2006/0219773 | A1 | 10/2006 | Richardson |
| 2006/0242062 | A1 | 10/2006 | Peterson et al. |
| 2007/0022053 | A1 | 1/2007 | Waserstein et al. |
| 2007/0064991 | A1 | 3/2007 | Douglas et al. |
| 2007/0086642 | A1 * | 4/2007 | Foth et al. ............ 382/137 |
| 2007/0172109 | A1 | 7/2007 | Agrawal et al. |
| 2007/0215691 | A1 | 9/2007 | Swift et al. |
| 2007/0217669 | A1 | 9/2007 | Swift et al. |
| 2007/0267477 | A1 | 11/2007 | Schott et al. |
| 2007/0288382 | A1 | 12/2007 | Narayanan et al. |
| 2008/0002886 | A1 * | 1/2008 | Revow et al. ............ 382/187 |
| 2008/0135610 | A1 | 6/2008 | Roh |
| 2008/0137939 | A1 | 6/2008 | Wang et al. |
| 2008/0140552 | A1 | 6/2008 | Blaikie |
| 2008/0279455 | A1 | 11/2008 | Wall |
| 2009/0018960 | A1 | 1/2009 | Gawne |
| 2009/0037339 | A1 | 2/2009 | Ancell et al. |
| 2009/0114715 | A1 | 5/2009 | Mueller et al. |
| 2009/0164372 | A1 | 6/2009 | Dell et al. |
| 2009/0236413 | A1 | 9/2009 | Mueller et al. |
| 2011/0206266 | A1 | 8/2011 | Faulkner et al. |
| 2011/0251956 | A1 | 10/2011 | Cantley et al. |
| 2011/0264572 | A1 | 10/2011 | Cucinotta |
| 2011/0280450 | A1 | 11/2011 | Nepomniachtchi et al. |
| 2012/0189186 | A1 | 7/2012 | Csulits et al. |
| 2013/0056531 | A1 | 3/2013 | Sato et al. |
| 2013/0243303 | A1 | 9/2013 | Imae et al. |
| 2013/0287284 | A1 | 10/2013 | Nepomniachtchi et al. |

OTHER PUBLICATIONS

"Instant verification of check quality and usability," Parascript, LLC, Longmont, Colorado, retrieved from the World Wide Web on Jul. 17, 2012.

"Check 21: Harnessing a Billion Points of Light," Mercator Advisory Group, May 24, 2004, Maynard, Massachusetts.

"Check Encoders," Starex Financial Systems—Banking Equipment. com, Northridge, California, retrieved from the World Wide Web on Jul. 17, 2012.

"Let's face it—it's hard to keep up," Silver Bullet Technology, Inc., Pensacola, Florida, retrieved from the World Wide Web on Jul. 17, 2012.

Klein, Bob, et al., "Image Quality and Usability Assurance: Phase 1 Project," The Financial Services Technology Consortium (Available from BITS—The Financial Services Roundtable, Washington, D.C.), Aug. 23, 2004.

"Electronic check processing solutions: Choosing the right option for retail payments," First Data, 2008, Atlanta, Georgia.

"Reduce exception item processing costs: New technology paves the way to new saving," Cummins Allison Corporation, Mt. Prospect, Illinois, retrieved from the World Wide Web on Jul. 16, 2012.

"Check 21 and Image Security," The Standard Register Company, Dec. 8, 2003, Wayne, New Jersey.

"X9LIB Software Development Toolkit," All My Papers, Aug. 8, 2012, Saratoga, California.

"MICR V Encoder M-570D," Progressive Business Systems, Inc., 2011, Auburn, Georgia.

"Correcting the Codeline (MICR line)," Financial Management Service—A Bureau of the United States Department of the Treasury, Washington, D.C, retrieved from the World Wide Web on Jul. 18, 2012.

"Vision IP:Check21—Delivering an end-to-end, image-enabled electronic payments environment," Metavante Corporation, 2008, Milwaukee, Wisconsin.

Ray Higgins, "Ramifications of MICR Mismatch in Check Image Exchange," All My Papers Publication, Third Edition, Jan. 2008.

Randy Malchar, "The Value of MICR for the Remote Check Depositor," Panini Advanced Solutions for Document Processing, 2008.

Ray Higgins, "Small Check Scanner MICR Read Performance Benchmark Study," Silvery Bullet Technology, Feb. 27, 2006.

\* cited by examiner

IMAGE CHECK CONTENT ESTIMATION AND USE

FIELD OF TECHNOLOGY

This application relates to providing transaction records. More specifically, the application relates to estimating transaction information based on handwritten check content.

BACKGROUND OF THE INVENTION

Financial institutions require knowledge of transaction information for record keeping, reporting and analysis. Although transactions are increasingly executed online and using transaction cards, checks continue to be used for executing transactions. While online transactions and transactions based on transaction cards are executed based largely on digital transaction data, checks are based on handwritten data. The handwritten transaction data require processing before they can be used advantageously in digital data products and analysis.

It would therefore be desirable to provide apparatus and methods for deriving a transaction record based on handwritten check content.

SUMMARY OF THE INVENTION

Apparatus, methods and media for deriving a transaction record based on handwritten check content are provided. The apparatus may include, and the methods and media may involve, a receiver device that is configured to receive a check image. The apparatus may include, and the methods and media may involve, a processor device. The processor device may be configured to define a check segment within the check image; translate content from the segment from handwriting to estimated block text; and store the block text in a transaction record in machine readable memory. The apparatus may include, and the methods and media may involve, a transmitter that is configured to transmit the block text to a financial institution product engine.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Apparatus, methods and media for deriving a transaction record based on handwritten check content are provided. The apparatus may include, and the methods and media may involve, a receiver device that is configured to receive a check image. The apparatus may include, and the methods and media may involve, a processor device. The processor device may be configured to define a check segment within the check image; translate content from the segment from handwriting to estimated block text; and store the block text in a transaction record in machine readable memory. The segment content also may be stored in the transaction record. The apparatus may include, and the methods and media may involve, a transmitter that is configured to transmit the block text to a financial institution product engine.

The transaction record may be one of a plurality of transaction records. The processor may be configured to sort the transaction records by customer account, customer name or any other field of the transaction record. The customer or customers may be provided with access to view some or all of the transaction record fields.

For example, when a check memo or "comment" field is part of the transaction record, the customer may use the comment field may be used to sort the transaction records.

Field values may be grouped into electronic folders. The customer may create, and designate for a type of purchase, a folder. For example, the customer may designate a folder for "SPORTING EVENTS." The customer may write a check to "NCAA (National Collegiate Athletic Association)" and may designate on the memo line, "SPORTING EVENTS." Based on that, the processor may associate the transaction record for the check with the folder named "SPORTING EVENTS."

The transaction record may include "families." A family may include estimated block text phrases that are similar, but not identical. The transaction record may include a field for "COMMENT FAMILY." The comment family field may group together similar but not identical comments. For example, the transaction record may include the comment family "SPORTS." The sports family may include family members such as: "SPORTS EVENT," "SPORTS EVENTS," "SPORTING EVENT," "SPORTING EVENTS," "SPORTS," "SPORTING GOODS," "SPORTS EQUIPMENT," "SPORTING EQUIPMENT," "SPORTING GEAR" and the like.

The processor may translate a check comment segment content. The processor may match the content to one of the family members, and populate the comment family field with the corresponding comment family. The processor may later provide the comment family as output for the customer along with other transaction record fields. In this way, the processor may help the customer identify the transaction record with a category when the customer wrote an inaccurate, imprecise, incomplete or inexact entry on the check memo line.

The processor may be further configured to formulate a label estimate that corresponds to the segment.

The transmitter may be further configured to formulate a check form field identifier estimate.

The processor may be further configured to select a segment label based on a closeness of fit between the label estimate and the check form field identifier estimate.

The processor may be further configured to co-register in the memory a label for the check segment and the content.

The processor may be further configured to co-register in the memory the block text with the label and the content.

The processor may be further configured to compare the content to a reference content; compare the estimated block text to a reference block text; and revise the estimated block text based on a difference between the estimated block text and the reference block text. The reference content may be derived from the check.

The processor may be further configured to run an application that translates content from the segment from handwriting to estimated block text. The application may be any suitable application. For example, the application may be an application such as that available under the trademark PARASCRIPT® from Parascript, LLC, Longmont, Colo. The application may pre-process the segment content by applying one or more mathematical filters to the segment content. The filter may include, for example, tools for line-detection, edge detection, curve detection, shape detection, contrast adjustment, feature density (such as the amount of "ink" pixels per unit area of segment or per unit length of a horizontal or vertical axis of the segment), feature density distribution (such as the amount of "ink" pixels per unit area as a function of location in the segment), topological quantification (such as the number, size, distribution and perimeter per unit area of closed forms in the content) and any other suitable tools.

The application may evaluate an objective function for a phrase from the segment content. The application may evaluate the objective function before a filter is applied. The application may evaluate the objective function after the filter is applied. The application may evaluate the objective function for many instances of the phrase so that the objective function value may be represented, as a random variable, by a probability density function. The objective function may be statistically correlated with reference block text that is known to correspond to the phrase. One or more parameters of the objective function may be trained so that unknown segment content may be evaluated and a corresponding block text may be estimated. The training may be based on any suitable model, such as a neural network, a multivariate statistical model or any other suitable model.

The check may be a first check; and the reference content may be derived from a second check.

The receiver may be configured to receive from a customer a revised estimated block text based on the estimated block text.

The check may be associated with a financial institution account. The account may be associated with one or more signatory customers. Each of the signatory customers may have his own handwriting. There may be a separate objective function for each customer. There may be a separate training model for each customer. There may be a separate objective function for each segment. There may be a separate training model for each segment. There may be a separate objective function for each customer and each segment. There may be a separate training model for each customer and each segment.

The apparatus and methods may involve translating segment content before the end of a day on which the underlying check is presented to the financial institution. Such a translation may be an intraday translation. Intraday translation may be performed before end-of-day translation. Sometimes, end-of-day translation is partially or fully human-based translation that involves manual keyboard entry of segment content. End-of-day translation may occur at the end of, or after the end of, a business day in which the check is presented to the institution. When intraday translation is performed, segment content translations may be stored in machine memory prior to the performance of end-of-day translations. When intraday translation of a check segment is performed, it may obviate the need for end-of-day translation of the segment.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
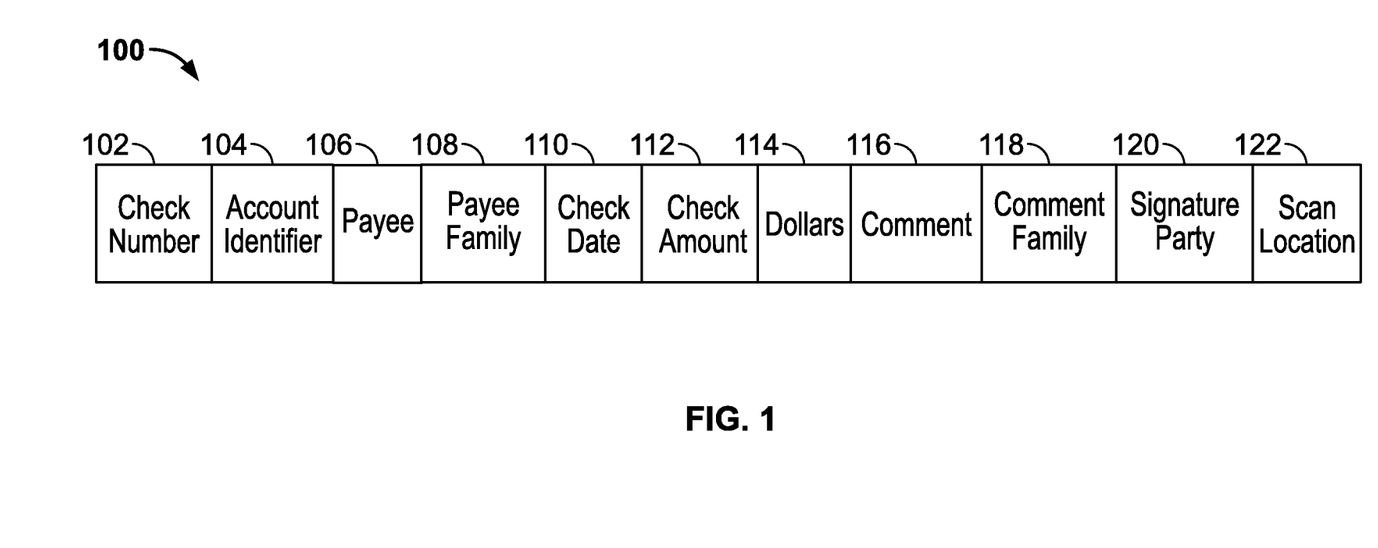
FIG. 1 shows illustrative information in accordance with the principles of the invention.

FIG. 1 shows transaction record 100. Transaction record 100 may include one or more fields such as check number 102, account identifier 104, payee 106, payee family 108, check date 110, check amount 112, dollars 114, comment 116, comment family 118, signature 120 and scan location 122.

Each of the fields may correspond to a segment of a check. The check may include one or more form field identifiers that correspond to the segment. For example, the form field identifiers may include "DATE," "PAY TO THE ORDER OF," "DOLLARS," "MEMO" and any other suitable identifiers.

Figure 2:
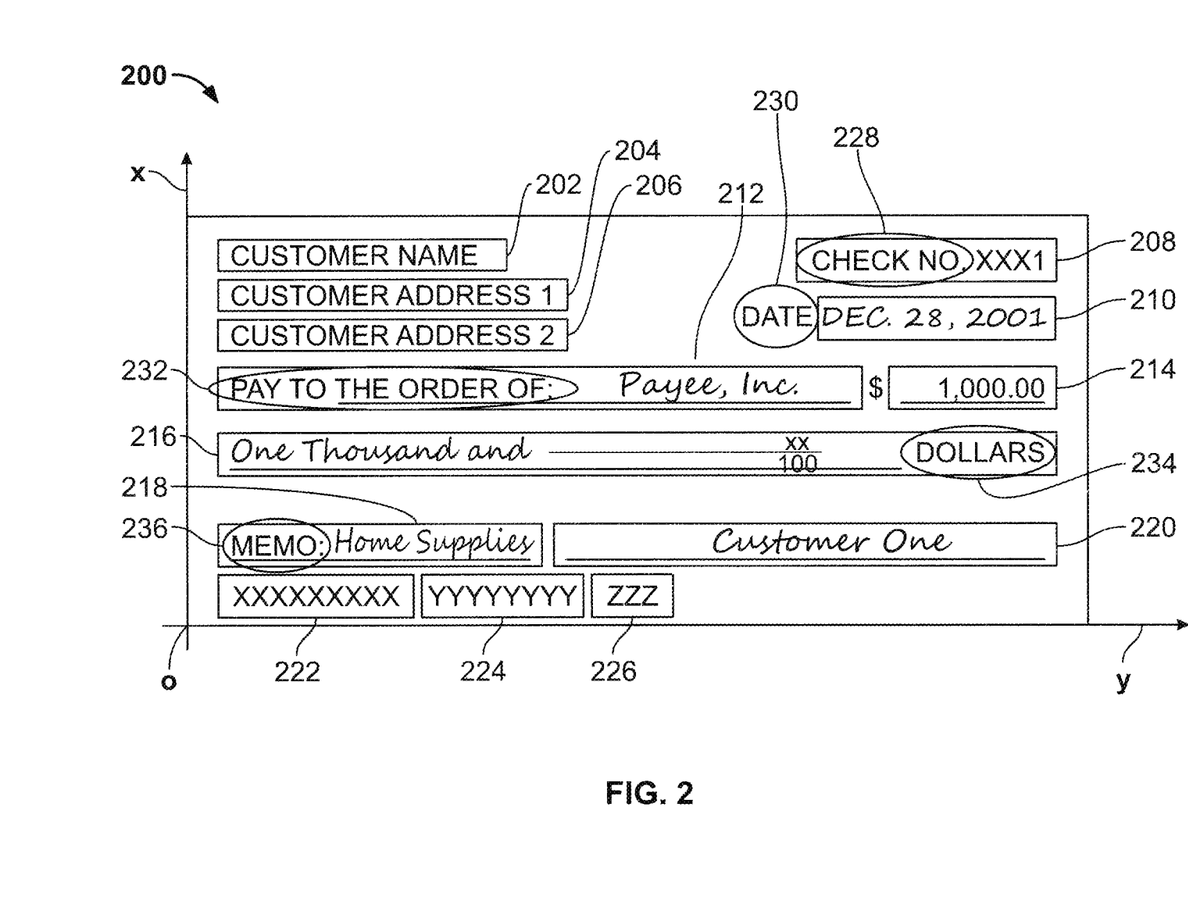
FIG. 2 shows an illustrative source of information that may be used in accordance with the principles of the invention.

FIG. 2 shows illustrative front check image 200. Check image 200 may include one or more segments. Each segment may correspond to a type of information that is included on the front of a check. In FIG. 2, check segments are identified by rectangular boxes. For example, check image 200 may include one or more of customer name segment 202, customer address 1 segment 204, customer address 2 segment 206, check number segment 208, date segment 210, payee segment 212, amount segment 214, dollars segment 216, comment segment 218, signature segment 220, routing number segment 222, account number segment 224, check number segment 226 and any other suitable segments.

Check image 200 may include one or more form field identifiers. Each form field identifier may correspond to a type of information that is displayed on the check to identify a check segment. For example, check image 200 may include one or more of "check number" form field identifier 228, "date" form field identifier 230, "pay-to-the-order-of" form field identifier 232, "dollars" form field identifier 234, "memo" form field identifier 236 and any other suitable form field identifiers.

Origin "O" may be identified as a location on check image 200 from which to quantify the relative locations of the segments. For example, origin O may be coincident with the lower left corner of a check upon which check image 200 is based. Axis "x" may run along an edge of the check. For example, axis x may run along the lower edge of the check. Axis "y" may be orthogonal to axis x and may run along an edge of the check. For example, axis y may run along the side edge of the check. Locations of each of the segments may be quantified by coordinates based on the x- and y-axes. For example, the location of a rectangular segment may be quantified as the coordinates of four corners of a rectangle. Any other suitable scheme for quantifying segment locations may be used.

Figure 3:
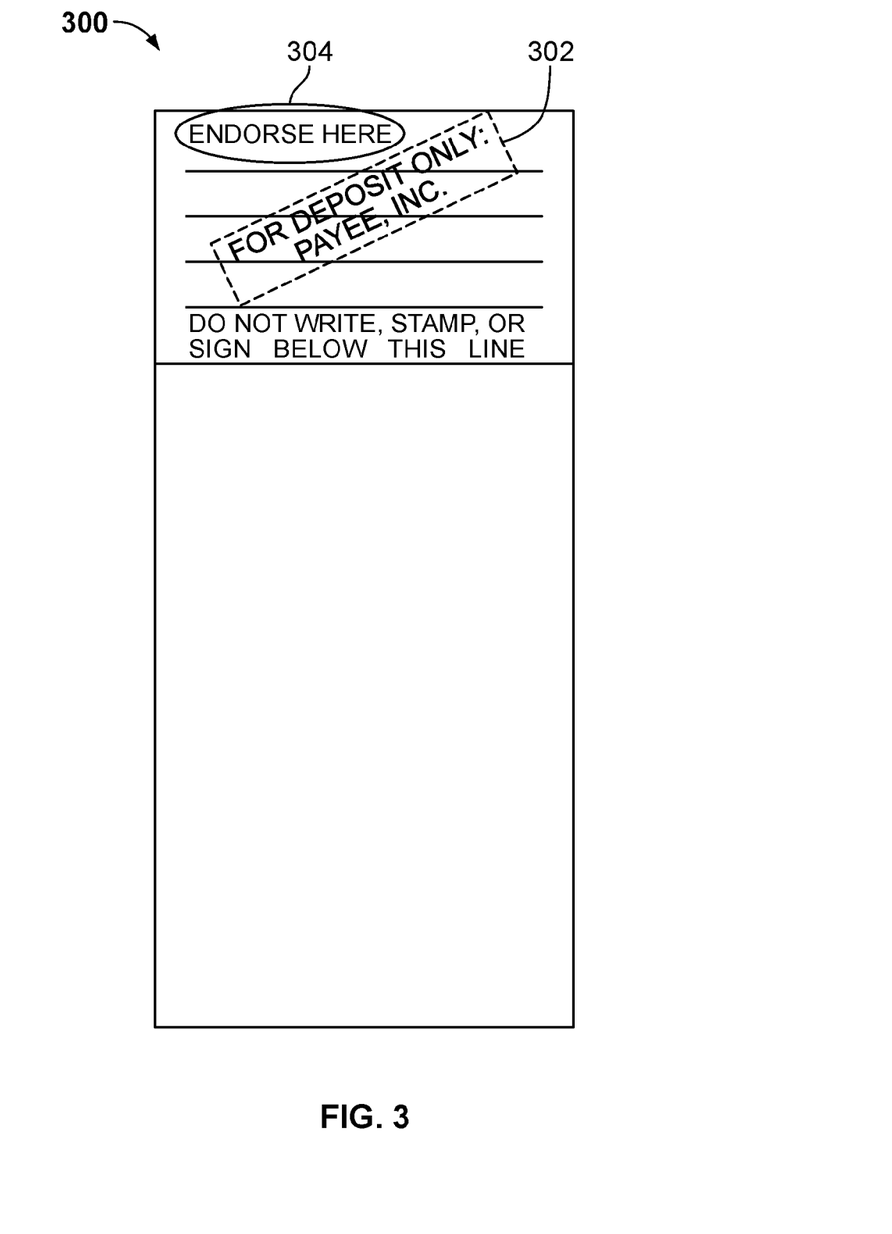
FIG. 3 shows another illustrative source of information that may be used in accordance with the principles of the invention.

FIG. 3 shows illustrative back check image 300. Back check image 300 may include one or more segments. Each segment may correspond to a type of information that is included on the back of a check. In FIG. 3, check segments are identified by rectangular boxes. For example, back check image 300 may include payee endorsement segment 302 and any other suitable segments.

Back check image 300 may include one or more form field identifiers. Each form field identifier may correspond to a type of information that is displayed on the check to identify a check segment. For example, check image 300 may include "endorse-here" form field identifier 304 and any other suitable form field identifiers.

Figure 4:
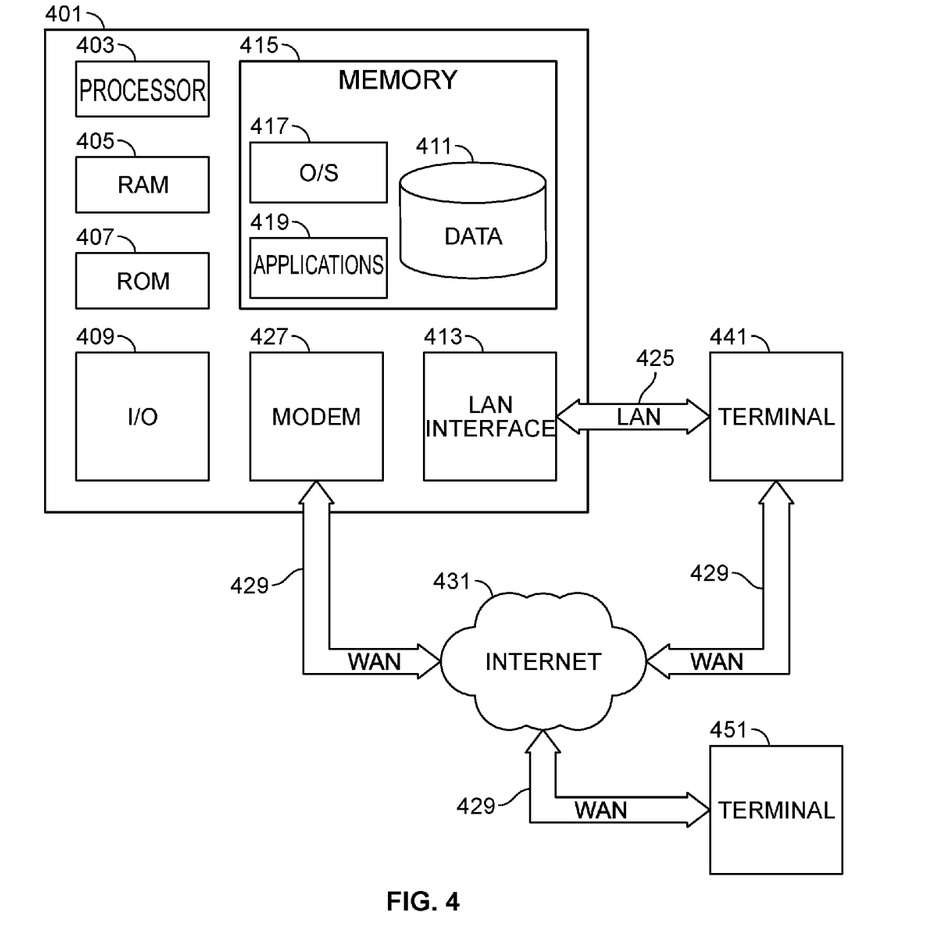
FIG. 4 shows apparatus that may be used in accordance with the principles of the invention.

Table 1 shows illustrative transaction record fields, illustrative corresponding check segments and illustrative corresponding form field identifiers.

user of device 401 may provide input, and may also include one or more of a speaker for providing audio output and a video display device for providing textual, audiovisual and/or graphical output. Software may be stored within memory 415 and/or storage to provide instructions to processor 403 for enabling server 401 to perform various functions. For example, memory 415 may store software used by server 401, such as an operating system 417, application programs 419, and an associated database 411. Alternatively, some or all of server 401 computer executable instructions may be embodied in hardware or firmware (not shown).

Server 401 may operate in a networked environment supporting connections to one or more remote computers, such as terminals 441 and 451. Terminals 441 and 451 may be personal computers or servers that include many or all of the elements described above relative to server 401. The network connections depicted in FIG. 4 include a local area network (LAN) 425 and a wide area network (WAN) 429, but may also include other networks. When used in a LAN networking environment, computer 401 is connected to LAN 425 through a network interface or adapter 413. When used in a WAN networking environment, server 401 may include a modem 427 or other means for establishing communications over WAN 429, such as Internet 431. It will be appreciated that the network connections shown are illustrative and other means of establishing a communications link between the computers may be used. The existence of any of various well-known

TABLE 1

Illustrative transaction record fields, illustrative corresponding check segments and illustrative corresponding form field identifiers.

| Illustrative transaction record fields (FIG. 1 reference numeral) | Illustrative corresponding check segments | Illustrative corresponding form field identifiers |
|---|---|---|
| Check number (102) | Check number segment (208) | |
| | Check number segment (226) | |
| Account identifier (104) | Customer name segment (202) | |
| | Customer address 1 segment (204) | |
| | Customer address 2 segment (206) | |
| | Routing number segment (222) | |
| | Account number segment (224) | |
| Payee (106) | Payee segment (212) | PAY TO THE ORDER OF (232) |
| | Payee endorsement segment (302) | ENDORSE HERE (304) |
| Payee family (108) | Payee segment (212) | PAY TO THE ORDER OF (232) |
| Check date (110) | Date segment (210) | DATE (230) |
| Check amount (112) | Amount segment (214) | |
| Dollars (114) | Dollars segment (216) | DOLLARS (234) |
| Comment (116) | Comment segment (218) | MEMO (236) |
| Comment family (118) | Comment segment (218) | MEMO (236) |
| Signature (120) | Signature segment (220) | |

FIG. 4 is a block diagram that illustrates a generic computing device 401 (alternatively referred to herein as a "server") that may be used in accordance with the principles of the invention. Server 401 may be included in any suitable apparatus that is shown or described herein. Server 401 may have a processor 403 for controlling overall operation of the server and its associated components, including RAM 405, ROM 407, input/output module 409, and memory 415.

Input/output ("I/O") module 409 may include a microphone, keypad, touch screen, and/or stylus through which a protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 419, which may be used by server 401, may include computer executable instructions for invoking user functionality related to communication, such as email, short message service (SMS), and voice input and speech recognition applications.

Computing device 401 and/or terminals 441 or 451 may also be mobile terminals including various other components, such as a battery, speaker, and antennas (not shown).

Terminal 451 and/or terminal 441 may be portable devices such as a laptop, cell phone, Blackberry™, or any other suitable device for storing, transmitting and/or transporting relevant information.

Any information described above in connection with database 411, and any other suitable information, may be stored in memory 415.

One or more of applications 419 may include one or more algorithms that may be used to derive a transaction record based on handwritten check content, receive check content information from an individual, issue a banking transaction receipt, provide online customer account management tools, provide customer account statements, calculate market analytics quantities, calculate targeted advertising quantities, and perform eWallet processes, and/or perform any other suitable tasks related to transaction record processing.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 5:
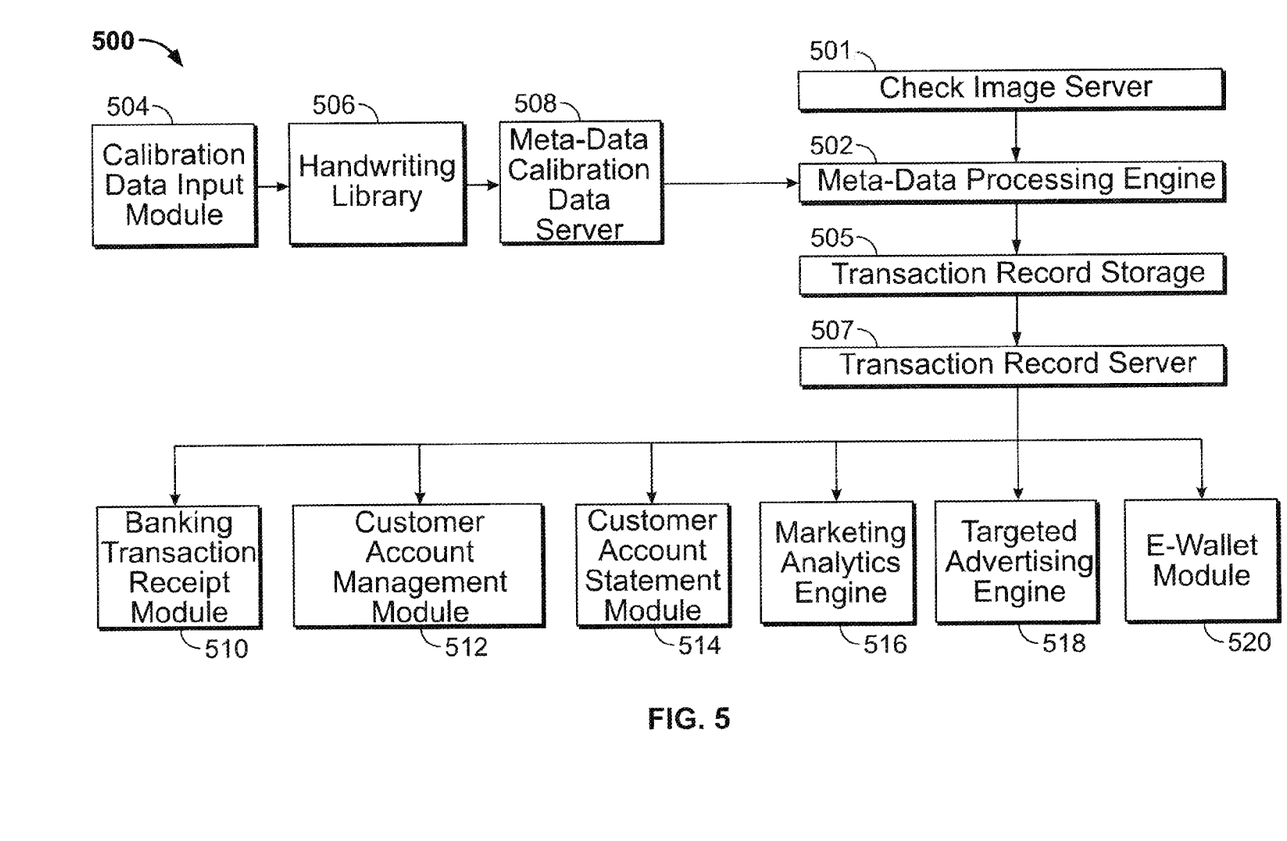
FIG. 5 an arrangement of apparatus and media in accordance with the principles of the invention.

FIG. 5 shows illustrative arrangement 500 for deriving a transaction record based on handwritten check content. One or more of the elements of arrangement 500 may include one or more of the features shown in FIG. 4. Arrangement 500 may include meta-data processing engine 502. Meta-data processing engine 502 may receive a check image, such as front check image 200 (shown in FIG. 2) or back check image 300 (shown in FIG. 3), from check image server 501.

Arrangement 500 may include calibration data input module 504. Calibration data input module 504 may receive from a customer a handwriting sample. The handwriting sample may correspond to printed character reference text. The customer may provide the printed character reference text. Meta-data processing engine 502 may provide the printed character reference text. The printed character reference text may be derived from printed character text on the check.

Handwriting may include cursive or script information written by hand or printed by machine. Printed character text may be block-style letters that are written by hand or printed by machine.

The handwriting sample may be a signature. The signature may be from a signature card that the customer signed to obtain signatory authority for an account. The printed character reference text may be prepared in connection with the signature.

The handwriting sample may be from a check image such as front check image 200 (shown in FIG. 2) or back check image 300 (shown in FIG. 3). The corresponding printed character reference text may be provided by a handwriting decoding algorithm, a financial institution agent, the customer or any other suitable system or individual.

The corresponding printed character reference text may be obtained from a check image such as front check image 200 (shown in FIG. 2) or back check image 300 (shown in FIG. 3). For example, the printed character reference text may be obtained from segment 302 of check image 300. Some or all of the content of segment 302 may correspond to some or all of the content of segment 212 of check image 200.

Handwriting library 506 may store the handwriting samples and the corresponding printed character reference text. Handwriting library 506 may store handwriting samples and corresponding printed character reference text for a plurality of accounts. Handwriting library 506 may store, in connection with one or more of the handwriting samples, a numerical function or functions that quantitatively characterize the handwriting sample. Handwriting library 506 may store handwriting samples and corresponding printed character reference text for a plurality of customers.

A handwriting sample may be collected from customers upon opening of an account. The handwriting sample may include a phrase. The phrase may be a letter. The phrase may be word. The phrase may be a sequence of words. The phrase may be a sentence. The phrase may be any suitable unit of writing. The phrase may include letters that are known to the institution. The institution may store the phrase as a reference phrase. The institution may provide the phrase to the customer. The customer may copy the phrase in cursive handwriting. The customer may copy the phrase in printed handwriting. The handwriting sample may include all capital letters. The handwriting sample may include all lower case letters. The handwriting sample may include both upper case and lower case letters. The handwriting sample may be paired in the library with reference phrase. The reference phrase may be used to associate some or all of the handwriting sample with the known letters.

The institution may provide the customer with an opportunity to enroll in a handwriting translation program. The program may involve some or all of the features of arrangement 500. The institution may provide the customer with an opportunity to open an account that involves some or all of the features of arrangement 500. The institution may provide the customer with an opportunity to provide a handwriting sample at the time of enrollment in the program or at the time of opening the account. The institution may provide the customer with an opportunity to provide a handwriting sample at any suitable time. For example, the institution may provide a web site that includes one or more reference phrases and instructs the customer how to provide the handwriting sample. The customer may provide the handwriting sample by writing the phrase on paper and scanning and transmitting the handwriting sample to the institution. The customer may provide the handwriting sample via stylus and tablet such that the handwriting sample is directly electronically transmitted to the institution via a customer device. The customer may provide the handwriting sample to the institution at a brick-and-mortar financial services center.

Meta-data calibration data server 508 may serve handwriting samples to meta-data processing engine 502. Meta-data calibration data server 508 may serve printed character reference text that corresponds to the handwriting samples to meta-data processing engine 502.

Meta-data calibration data server 508 may include a processor (not shown) that compares check segment content to a library handwriting sample. For example, the processor may receive check segment content from meta-data processing engine 502. The processor may generate one or more numerical functions that correspond to the check segment content. The processor may quantitatively compare the one or more check segment content numerical functions to the one or more handwriting sample numerical functions. The processor may thus identify a handwriting sample that matches or partially matches the check segment content. The match or partial match may be based on an objective function that indicates a degree of likeness between the handwriting sample and the check segment content.

If a match or partial match is found, meta-data calibration data server 508 may provide to meta-data processing engine 502 the printed character reference text that corresponds to the handwriting sample.

Arrangement 500 may include transaction record storage 505. Transaction record storage 505 may include one or more transaction records such as transaction record 100 (shown in FIG. 1).

Arrangement 500 may include transaction record server 507. Transaction record server 507 may be configured to deliver the one or more transaction records, or portions thereof, to one or more of banking transaction receipt module 510, online customer account management module 512, customer account statement module 514, marketing analytics engine 516, targeted advertising engine 518 and e-wallet module 520.

Banking transaction receipt module 510 may include a repository of historical transaction records such as transaction record 100 (shown in FIG. 1). Module 510 may include an electronic access portal (not shown). A user, such as the financial institution, the customer or any other suitable user may use the portal to view the records.

The module may provide data controls for the user to modify estimated segment content. The module may provide database tools for organizing the transaction records by segment label. The transaction records may be arranged in folder structures, tree structures or any other suitable structure. Module 501 may provide historical transaction record mining, purchasing trend analytics or any other suitable analysis tools.

Customer account management module 512 may provide the user with account preference management tools. The tools may perform, for example, electronic receipt management, historical transaction record report generation, marketing analysis, purchasing behavior modeling, purchasing behavior analytics, budgeting analysis and reporting, balance alerting, account information notification and any other suitable functions.

The user may access customer account management module 512 via any suitable communication network. For example, if the user is a financial institution agent, the user may access customer account management module 512 via a local area network, such as a secure private network. If the user is a customer, the customer may access customer account management module 512 via a wide area network, such as the Internet.

Customer account statement module 514 may provide the user with online account statements that include transaction records such as transaction record 100 (shown in FIG. 1). Module 514 may include one or more data display controls (not shown) with which the user may select segments for viewing. The segments may be viewed in rows. The segments may be sortable.

A user may use module 514 go manage and communications between the institution and the customer over and between paper-based communications, voice communications, online communications, text communications and e-wallet communications.

Marketing analytics engine 516 may quantify customer spending behavior. The behavior may be used to define one or more spending patterns. The patterns may be used to select marketing information for presentation to the customer or a class of customers that includes the customer. The patterns may be used to select promotional information for presentation to the customer or a class of customers that includes the customer. The patterns may be used to formulate or modify products and services.

Targeted advertising engine 518 may leverage information gained from check segments to enrich interactions between the financial institution and the customer. The interactions may include personalized messages that are based on check segment content. The messages may be transmitted in paper mailings, email, web pages, text messages, voice messages or any other suitable form of transmission.

The personalized messages may include information that is analytically or statistically derived from the check segment content. For example, a message may inform the customer that the customer has purchased X dollars worth of a certain product type, e.g., home furnishings, in Y transactions over the past Z months. The message may inform the customer that other institution customers with similar transaction behavior have purchased a total P dollars worth of home furnishing products in Q transactions over the past Z months. The message may inform the customer of the top N payees in the Q transactions. The message may inform the customer of financial institution perks or benefits that the institution may provide for the purchase of the product type.

E-wallet module 520 may provide an interface with an e-wallet service. The e-wallet service may be provided, owned, controlled or supported by the financial institution.

Figure 6:
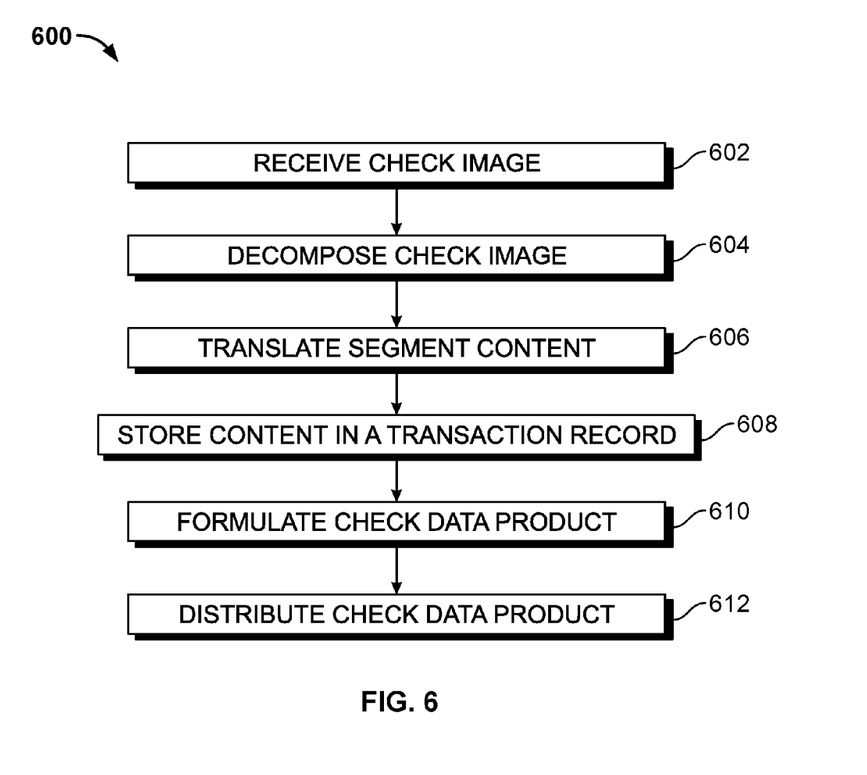
FIG. 6 shows illustrative elements of a process in accordance with the principles of the invention.
Figure 7:
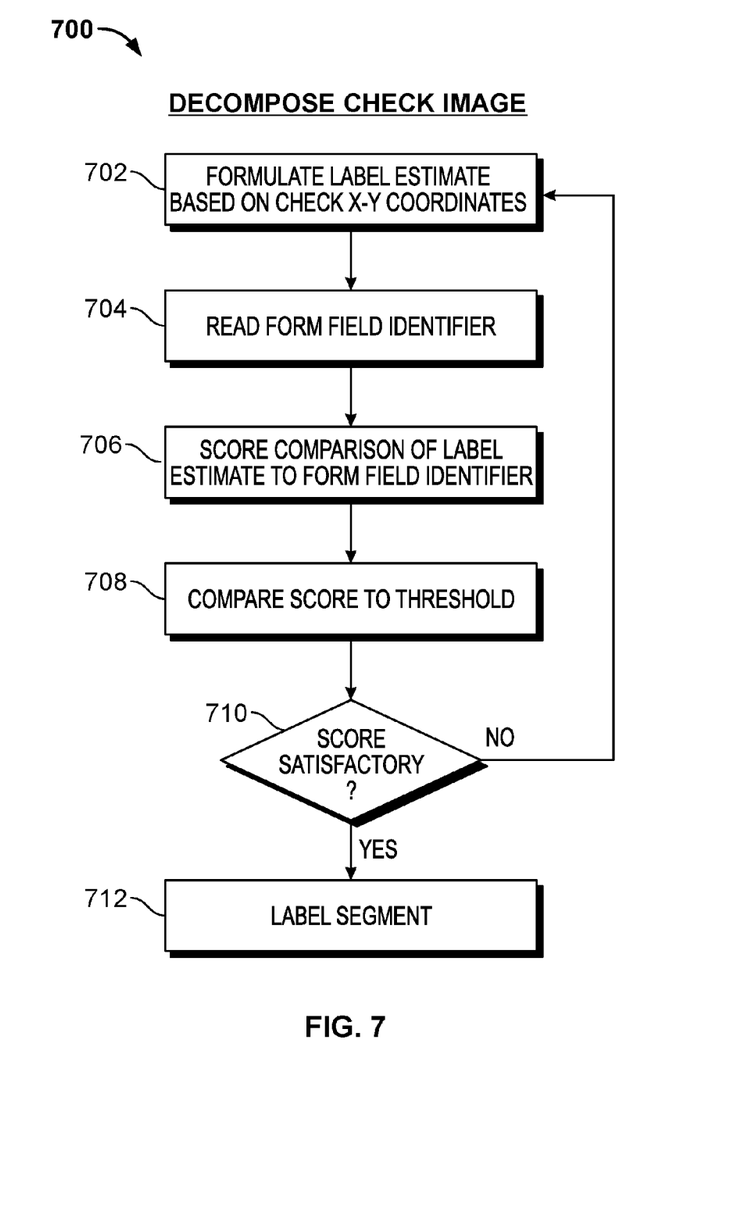
FIG. 7 shows illustrative elements of another process in accordance with the principles of the invention.
Figure 8:
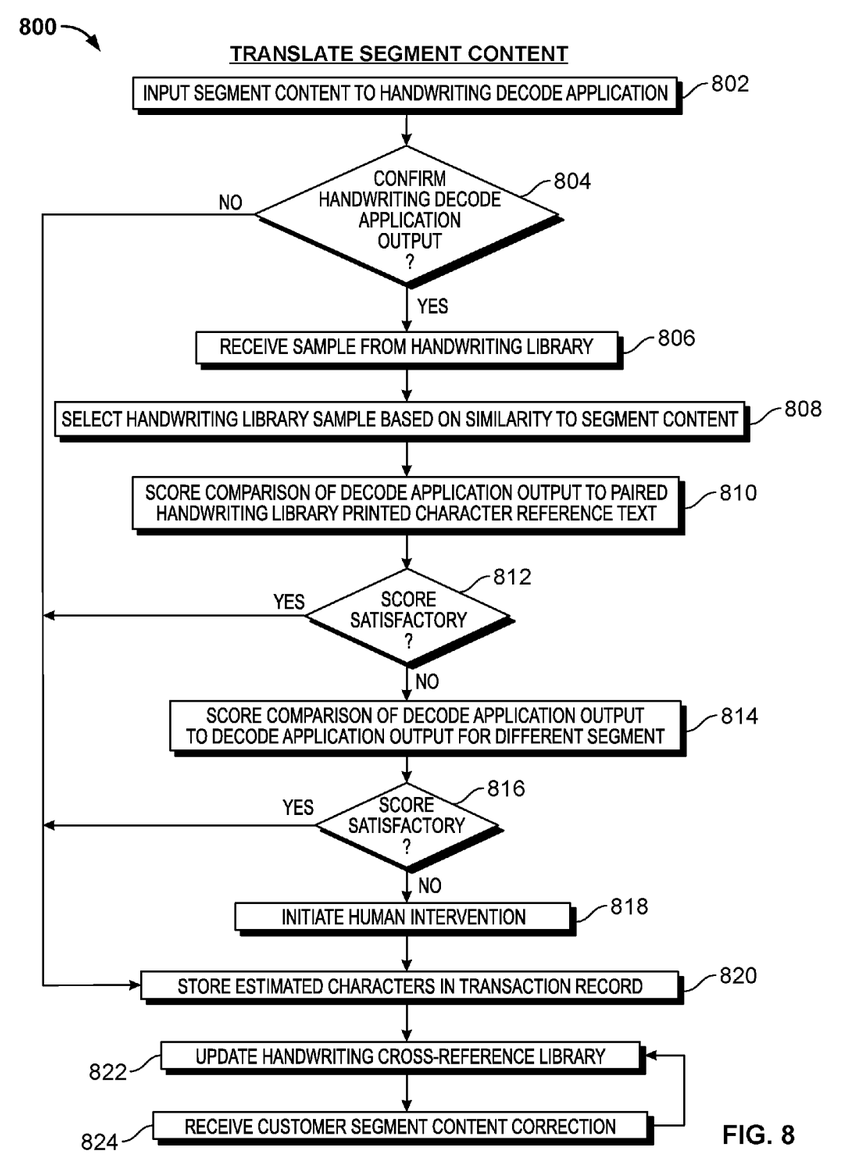
FIG. 8 shows illustrative elements of yet another process in accordance with the principles of the invention.

Processes in accordance with the principles of the invention may include one or more features of the processes illustrated in FIGS. 6-8. For the sake of illustration, the steps of the illustrated processes will be described as being performed by a "system." The "system" may include one or more of the features of the apparatus shown in FIGS. 4 and 5 and/or any other suitable device or approach. The "system" may be provided by an entity. The entity may be an individual, an organization or any other suitable entity. For example, the entity may be a financial institution or an agent of a financial institution.

FIG. 6 shows illustrative process 600 for providing a check data product. The check data product may be based on one or more transaction records such as transaction record 100 (shown in FIG. 1). Process 600 may begin at step 602. At step 602, the system may receive a check image. At step 604, the system may decompose the check image to isolate a segment. At step 606, the system may translate content of the segment. At step 608, the system may store translated content in a transaction record. At step 610, the system may formulate a check data product based on the record.

The system may provide a data product based on some or all of the fields of transaction record 100. The data product may include a subset of the fields of record 100. The data product may be conformed to input requirements of different modules and engines such as 510, 512, 514, 516, 518, 520 (shown in FIG. 5) or any other suitable module or engine. One or more of the modules may provide the system with an input template. The input template may inform the system which of the fields to include in the data product. The input template may inform the system how to format the fields in the data product.

At step 612, the system may distribute the check data product to one or more product modules or engines such as banking transaction receipt module 510, online customer account management module 512, customer account statement module 514, marketing analytics engine 516, targeted advertising engine 518 and e-wallet module 520.

FIG. 7 shows illustrative process 700 for decomposing the check image. The system may execute one or more of the steps of process 700 in connection with the execution of step 604 of process 600 (shown in FIG. 6). Process 700 may begin at step 702. At step 702, the system may formulate a label estimate for a segment based on check X-Y coordinates, such as those discussed in connection with FIG. 3. A segment may be isolated using any suitable object-identification algorithm.

For example, the system may estimate that segment 212 (shown in FIG. 2) is a payee segment based on values of its x and y coordinates. Y coordinates near or above the y midpoint of the check and x coordinates that span from near the left margin of the check to a central right portion of the check may be associated with payee segments.

At step 704, the system may read a form field identifier. The form field identifier associated with payee segment 212 is form field identifier 232 ("PAY TO THE ORDER OF:"). At step 706, the system may score a comparison of label. The system may perform character recognition on the form field identifier.

At step 706, the system may score a comparison of the label estimate to form field identifier 232. The system may estimate the likelihood that the characters of form field identifier 232 correspond to a payee segment. Any suitable index of the likelihood may be used to score the comparison.

At step 708, the system may compare the score to a threshold. The threshold may include, for example, a confidence interval or limit.

At step 710, the system may determine if the score is satisfactory. If the score does not meet or exceed the threshold, process 700 may continue at step 702 to re-estimate the segment label. If the score does meet or exceed the threshold, process 700 may continue at step 712. At step 712, the system may label the segment. For example, the system may label segment 212 of check image 200 (shown in FIG. 2) as "PAYEE." The content of segment 212 may be associated with the "PAYEE" label in transaction record 100 (shown in FIG. 1).

FIG. 8 shows illustrative process 800 for translating check segment content. The system may execute one or more of the steps of process 800 in connection with the execution of step 606 of process 600 (shown in FIG. 6). Process 800 may begin at step 802. At step 802, the system may input segment content to a handwriting decoding application. Any suitable handwriting decoding application may be used. For example, the system may use. The handwriting decoding application may output estimated characters that corresponds to the segment content.

At step 804, the system may determine whether to confirm the estimated characters. For example, the system may include a switch that configures the system to confirm the estimated characters. The switch may be conditional. For example, the switch may be set for confirmation of only check segments that are associated with selected label. For example, the system may confirm only estimated characters that correspond to payee segment content. The switch may be set for confirmation of only selected estimated characters. For example, the system may confirm only estimated characters that correspond to selected payees. The selected payees may be selected based on past errors in estimation of the payee name. The past errors may be identified by the system. The past errors may be identified by the customer.

If at step 804 the system determines to not confirm the handwriting decode application output, process 800 may continue at step 820. At step 820, the system may store the estimated characters in a transaction record such as transaction record 100 (shown in FIG. 1). When the estimated characters are based on segment 232 of check image 200 (shown in FIG. 2), the estimated characters may be "PAYEE, INC.". The characters "PAYEE, INC." may therefore be stored in payee field 106 of transaction record 100.

At step 822, the system may update handwriting library 506 by appending the content of segment 232 and the estimated characters "PAYEE, INC." to library 506.

At step 824, the system may receive from a customer a segment content correction. For example, the system may provide to the customer a view of the segment content and a view of the estimated characters that correspond to the segment content. The customer may provide to the system a correction of the estimated characters. If the customer provides the correction, process 800 may continue at step 822.

If at step 804 the system determines to confirm the handwriting decode application output, process 800 may continue at step 806. At step 806, the system may identify a first handwriting sample in handwriting library 506 (shown in FIG. 5).

At step 808, the system may identify a second handwriting sample from handwriting library 506. The system may select, from the first and second handwriting samples, that handwriting sample that most closely matches the input segment content. The system may use any suitable pattern recognition algorithm and any suitable quantitative approach to select the most closely matching handwriting sample.

At step 810, the system may score a comparison between the handwriting decode application output generated in step 802 and the most closely matching handwriting library printed character reference text.

At step 812, the system may determine whether the score of step 810 is satisfactory. If the score is satisfactory, process 800 may continue at step 820, which is described above along with illustrative subsequent steps.

If at step 812, the system determines that the score of step 819 is not satisfactory, process 800 may continue at step 814. At step 814, the system may score a comparison of the decode application output to decode application output for a different segment in the same check. For example, if the system is not satisfied by a score comparing decode application output for a first segment to a library sample or samples, the system may decode a second segment from the same check, whether or not the second segment has been translated and stored in the library. The system may translate the second segment using illustrative steps of process 800. If the second segment translates well, for example, based on a score such as that in step 810, the system may compare the first segment's decode application output to the translation of the second segment. The system may score the comparison.

The second segment may include printed character text. For example, the printed character text may be present in a segment such as segment 302 in back check image 300 (shown in FIG. 3). Because segment 302 may include payee information, and may include printed character text, the system may use a decode application output based on segment 302 content as a basis for confirming the decoding of content from payee segment 212 in front check image 200 (shown in FIG. 2).

The system may perform sub-segment pattern analysis. The system may identify a handwritten letter of the alphabet based on a corresponding printed character reference text. The pattern of the handwritten letter may then be used to identify a letter in a segment that requires decoding.

At step 816, the system may determine whether the score of step 814 is satisfactory. If the score is satisfactory, process 800 may continue at step 820, which is described above along with illustrative subsequent steps.

If at step 816, the system determines that the score of step 814 is not satisfactory, process 800 may continue at step 818. At step 818, human intervention may be initiated. The human intervention may involve a financial institution agent. The agent may be an employee, an appointee, a partner a contractor or any other suitable agent. The agent may view the segment content and provide the system with a translation into printed characters.

Process 800 may continue at step 820, which is described above along with illustrative subsequent steps.

Figure 9:
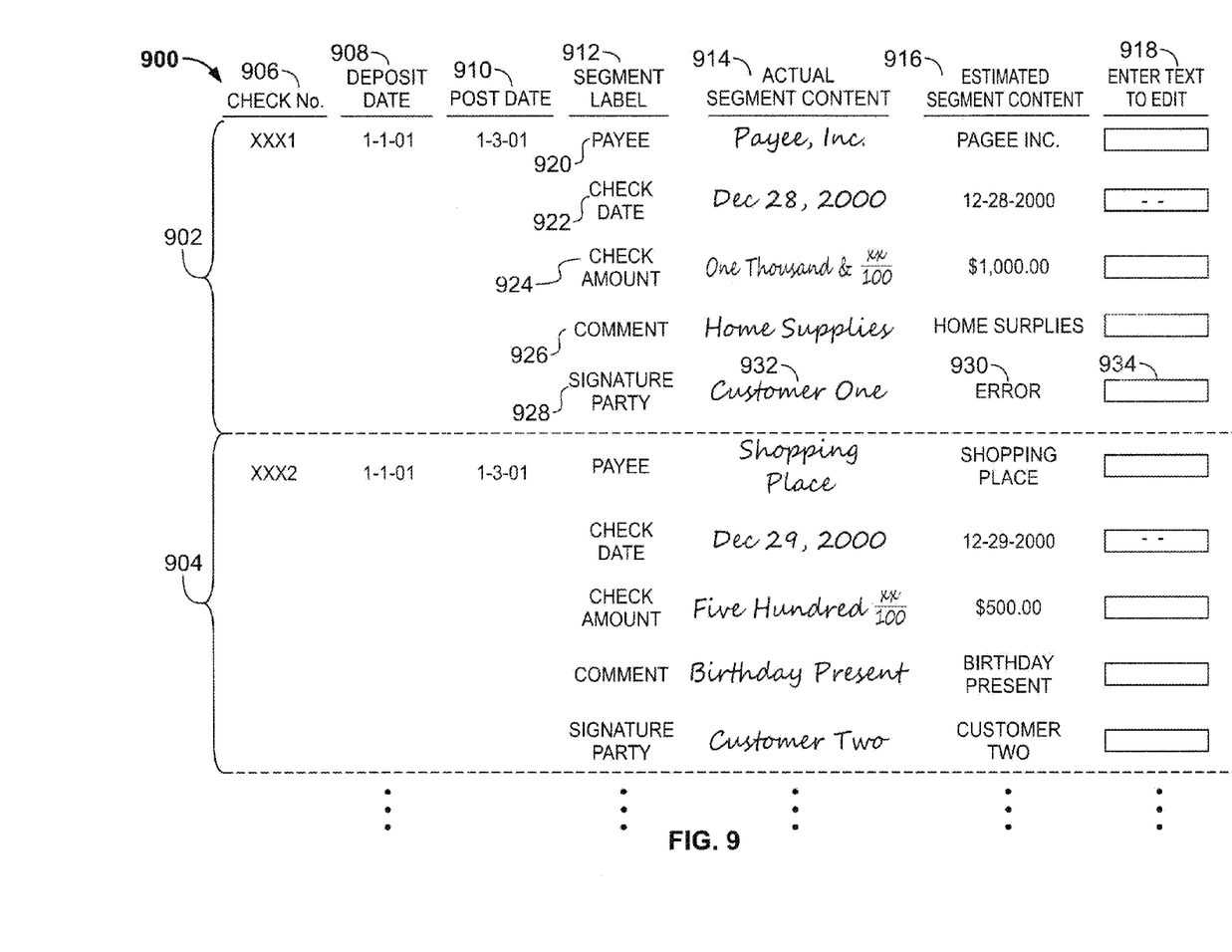
FIG. 9 shows other illustrative information in accordance with the principles of the invention.

FIG. 9 shows illustrative information 900. The system may present all or some of information 900 to a user. The user may be a financial institution agent, a customer or any other suitable individual or entity. Information 900 may be a product that the system delivers to a product module or engine. For example, the system may deliver information 900 to online customer account management module 512 (shown in FIG. 5).

Information 900 may include information that corresponds to one or more transaction records such as transaction record 100 (shown in FIG. 1). Information 902 may correspond to information in one or more fields of transaction record 100. Information 904 may correspond to information in one or more fields of a different transaction record (not shown). Information 900 may include information from any suitable number of transaction records. The system may provide transaction records that are designated for an individual customer, a group of customers, an individual account, a group of accounts, or any other suitable category.

Information 900 may include for each transaction record check number 906, deposit date 908, post date 910, check image segment labels 912, actual segment contents 914 (showing image of segment or sub-segment or sub-segments), estimated segment contents 916 (showing estimated block text), editing fields 918 and any other suitable information or user-usable information controls.

For each check, information 900 may include one or more segment labels. For example, for check number XXX1, information 900 may include PAYEE 920, CHECK DATE 922, CHECK AMOUNT 924, COMMENT 926, SIGNATURE PARTY 928 and any other suitable segment labels.

The user may use editing fields 918 to provide character text to correct segment content estimation errors in PAYEE 920, in which PAYEE, INC. was translated as PAGEE, INC. The user may use editing fields 918 to correct segment content estimation errors in COMMENT 926, in which HOME SUPPLIES was translated as HOME SURPLIES.

Estimated segment content field 930 shows "ERROR," which indicates that the system was unable to obtain a satisfactory score, for example, in process 800 (shown in FIG. 8), when the system attempted to translate content 932 from signature party segment 928. The user may use editing field 934 to provide the system with the correct signature party.

The customer may use one or more elements such as the elements of information 900 to sort transaction records. For example, the customer may use account number (when the customer has more than one account), customer name (when there is more than one signatory customer on an account), a field family (such as "PAYEE FAMILY" or "COMMENT FAMILY," such as those in transaction record 100 (shown in FIG. 1)), or one or more of the elements shown as part of information 900 to sort the transaction records.

Thus, apparatus and methods for deriving a transaction record based on a handwritten check have been provided. Persons skilled in the art will appreciate that the present invention can be practiced by other than the described embodiments, which are presented for purposes of illustration rather than of limitation. The present invention is limited only by the claims that follow.

What is claimed is:

1. Apparatus for processing a transaction record based on handwritten check content, wherein each check is associated with a separate transaction record and each transaction record comprises a plurality of fields corresponding to content of one of a plurality of segments on the face of the check, the apparatus comprising:

a processor device that is configured to present to a customer actual handwritten check segment content from a check signed by the customer or by an associated signatory party and estimated check segment content based on the handwritten check segment content; and a receiver that is configured to receive from the customer revised estimated check segment content;

wherein the processor is configured to associate the revised estimated check segment content with a transaction field and store the revised estimated check segment content in the transaction record;

wherein, when the check segment is a comment segment, the processor is further configured to:

associate a phrase in the comment segment revised estimated check content with a comment family;

populate a comment family field in the transaction record with the comment family associated with the phrase; and store the transaction record in an electronic folder associated with the comment family, wherein, in response selection of the folder by the customer, the processor is configured to present to the customer one or more transaction records associated with the comment family.

2. The apparatus of claim 1 wherein:

the receiver is further configured to receive from the customer a handwriting sample that corresponds to a reference phrase, the handwriting sample comprising handwritten check segment content associated with a first check; and the processor is further configured to:

derive the reference phrase from handwritten check segment content associated with a second check;

formulate an objective function that defines a relationship between the handwriting sample and the reference phrase; and use the objective function to formulate the estimated check segment content.

3. The apparatus of claim 2 wherein the objective function includes a neural network model.

4. The apparatus of claim 1 wherein the receiver is further configured to receive from the customer an instruction to present a sorted list of transaction record fields that include the estimated check segment content.

5. A method for processing a transaction record based on handwritten check content, wherein each check is associated with a separate transaction record and each transaction record comprises a plurality of fields corresponding to the content of one of a plurality of segments on the face of the check, the method comprising:

presenting to a customer actual handwritten check segment content from a check signed by the customer or by an associated signatory party, and estimated check segment content associated with the check; and receiving from the customer revised estimated check segment content, wherein the revised estimated check content is associated with a transaction field and stored in the transaction record;

wherein, when the check segment is a comment segment, the processor is further configured to:

associate a phrase in the comment segment revised estimated check content with a comment family;

populate a comment family field in the transaction record with the comment family associated with the phrase; and store the transaction record in an electronic folder associated with the comment family, in response to selection of the folder by the customer, the processor is configured to present to the customer one or more transaction records associated with the comment family.

6. The method of claim 5 wherein:

the receiving further comprises receiving, from the customer, a handwriting sample that is based on a reference phrase; and the presenting further comprises presenting to the customer, the reference phrase.

7. The method of claim 6 further comprising:

formulating an objective function defining a relationship between the handwriting sample and the reference phrase; and formulating the estimated check segment content using the objective function.

8. The method of claim 7 wherein the objective function includes a neural network model.

9. The method of claim 5 wherein the receiving further comprises receiving, from the customer, an instruction to present a sorted list of transaction record fields that include the estimated check segment content.

* * * * *